Patented June 9, 1953

2,641,677

UNITED STATES PATENT OFFICE 2,641,677

HEATER FOR BOTTLED BEVERAGES

James W. Taylor, Brunswick, Ga.

Application October 5, 1950, Serial No. 188,598

7 Claims. (Cl. 219—37)

This invention relates to improvements in heaters for bottled beverages, such as bottled chocolate milk, or the like, and particularly to a novel and improved combined support and heater for such bottled beverages.

One object of this invention is to improve heaters for bottled beverages which heat the beverage while still in the container.

Another object of this invention is to provide an improved heater for bottled beverages which protects the bottles or other containers from making direct contact with the heating element, and which also protects the heating element from the liquid in or on the container against accidentally spilling directly thereon.

A further object of this invention is to provide a baffle or deflector which distributes the heat evenly about the containers and prevents direct heat from reaching the containers, thus causing breakage of the same if glass bottles, or from scorching the contents being heated.

Another object of this invention is to provide an improved heater for bottled beverages which is simple and inexpensive, and is compact and which can be used to heat bottled beverages, such as bottled chocolate milk or the like, by placing the heater inside an enclosing cabinet.

In order to accomplish the above objects, I provide a rack which is adapted to support a bottle or number of containers thereon. The rack is supported on legs, and attached to these legs and spaced therefrom below the rack are electrical or other suitable heating elements which are provided with a housing and deflector that prevents any of the contents from the containers while on the rack from spilling directly onto the heating element, and which also causes the heated air to circulate uniformly around the containers.

Other objects and advantages of this invention will become apparent as the discussion proceeds and when considered in connection with the accompanying drawings showing a preferred embodiment of my invention, in which.

Figure 1:
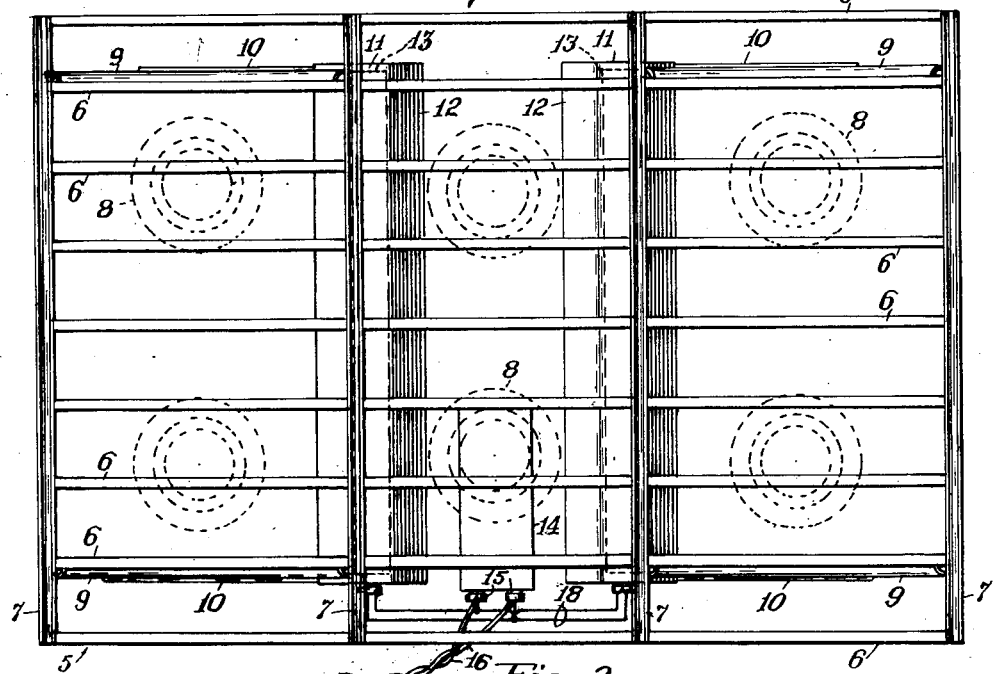
Fig. 1 is a top plan view, partly diagrammatic.
Figure 2:
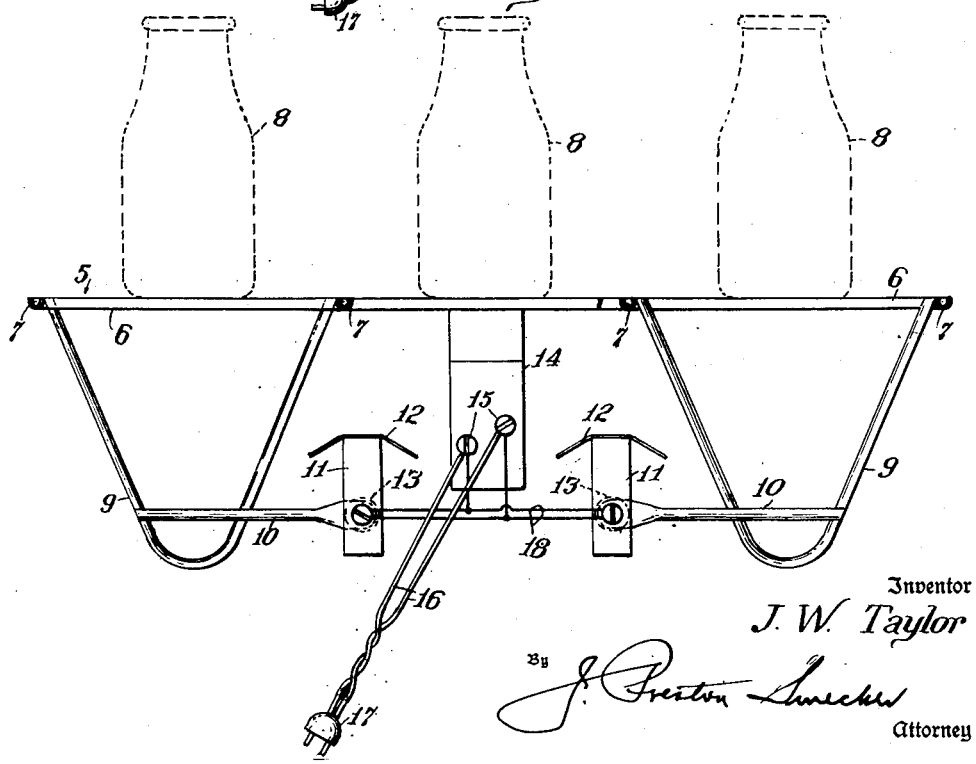
Fig. 2 is an end elevation thereof.

Turning now to a detailed description of the drawings, the numeral 5 designates, generally, a flat rack illustrated as rectangular and which is made of elongated rods 6 held together in spaced relation by means of cross rods 7. The cross rods 7 are secured to the elongated rods 6 in any suitable manner, as by welding, soldering, or the like, and preferably should be so arranged that they are either below the rods 6 or are flush with the surface thereof, as best shown in Fig. 2.

This arrangement permits the placing of containers 8 any place desired on the rack 5. While the rack 5 is illustrated as being rectangular, it is to be understood that it may be round, square, or of any other shape desired, as long as a flat or substantially flat surface is provided which is capable of supporting containers thereon. The rack 5 may also be made of relatively thin, but stiff, sheet metal or other heat resisting material, with suitable apertures provided therein at spaced intervals throughout the surface thereof. The particular type of material in the rods 6 and 7 is not of critical importance, but rust resistant metal rods have been found most desirable, although it is contemplated within the spirit of this invention, that other suitable material may be used as long as it is sufficiently heat resistant.

Supporting the rack at the four corners thereof are legs 9, shown as U-shaped. As best shown in Fig. 2, the legs 9 are secured to the rods 6 in any suitable manner, such as by welding, soldering, or the like. A bracket arm 10 is provided on each leg 9, as shown, and extends across the sides of the U-shaped leg 9 in bridging relation thereon and projecting therefrom in cantilever fashion. Each of the arms 10 extends substantially parallel to the rack 5 and is welded or otherwise suitably secured to the leg 9 in any manner, or it may be formed integral therewith by bending one side in the form of a loop. The arms 10 attached to the legs 9 at one side of the rack 5 extend inwardly toward the opposing arms 10 attached to the legs 9 at the opposite side of the rack.

A pair of housings 11 are mounted upon the ends of the bracket arms 10 and extend substantially throughout the length of the rack 5, as shown. Each housing 11 extends in bridging relation between the inner ends of a pair of arms 10 and is supported by the arms. The housings 11 are suitably mounted on the ends of the bracket arms 10 in any manner desired, as by welding or preferably by riveting or bolting.

A pair of deflectors 12 are provided on each housing 11 and extend throughout the length thereof, as shown. The deflectors 12, preferably, are inclined downwardly away from the rack 5, as best shown in Fig. 2. Located within each of the housings 11 is a suitable heating element 13, which may be of any type desired, such as an open flame or an electrical resistance heater. It is preferred, however, that an electrical resistance heater be used, which may be of conventional design and may be purchased on the open market.

If desired, a block 14 may be suspended from the rack 5, as shown. The block 14 serves as a suitable electrical connection panel, preferably of insulating material, and is provided with a pair of screw tap connectors 15, to which there is connected a pair of wires 16 having a plug 17 on the end thereof adapted for connection with a conventional electrical outlet, which is of the customary 110-volt household type. The electrical resistance elements 13 are each connected in parallel to the screw tap connectors 15 by means of wires 18.

The operation of my device is as follows:

The bottles 8 containing the beverage, such as chocolate milk or the like, are placed upright upon the surface of the rack 5, and the plug 17 is connected to a suitable electric outlet. This causes the heating elements 13 to heat the air surrounding the housing 11. The deflectors 12 direct the air laterally in both directions away from the housing 11 so that a circulation of air is set up around the containers 8 and uniform heating of the contents without scorching is thereby afforded. The deflectors 12, as well as the housing 11, also serve a secondary purpose of preventing any liquid which may collect on the outside of the containers 8, as well as any which may be spilled, from reaching directly the heating elements 13 and thus cause damage to or deterioration thereof.

It is contemplated, also, that the rack be placed in a suitable housing during use, as inside of an insulated drink box, not shown.

It is to be understood that various changes in structural form and shape of my heater may be resorted to without deviating from the spirit of this invention other than as defined by the appended claims.

I claim:

1. A bottled beverage heater comprising a rectangular rack for supporting beverage containers thereon, said rack comprising a plurality of spaced rods and connecting cross rods secured thereto forming a rectangle, U-shaped rods secured to some of the spaced rods at the corners of said rectangle forming legs, an arm secured to each of said U-shaped rods, a pair of elongated housings each mounted between a pair of said arms and extending substantially throughout the width of said rack, deflectors disposed at an angle away from said rack and carried on and adjacent the top of each of said housings and extending substantially throughout the length thereof, and heating means mounted in said housings.

2. A bottled beverage heater comprising a rectangular rack for supporting beverage containers thereon, said rack comprising a plurality of spaced rods and connecting cross rods secured thereto forming a rectangle, U-shaped rods secured to some of the spaced rods at the corners of said rectangle forming legs, a cantilever arm secured to each of said legs and mounted in bridging relation across the rods of said legs, a pair of elongated housings each mounted at one end on one of said arms, flanges disposed at an angle away from said rack and carried on each of said housings and extending substantially throughout the length thereof, and an electrical resistance heating means mounted in each of said housings.

3. A bottled beverage heater comprising a rack for supporting beverage containers thereon, said rack comprising a plurality of spaced rods and connecting cross rods secured thereto, U-shaped rods secured to some of the spaced rods forming legs, a cantilever arm secured to each of said legs, each of said arms extending substantially parallel to said rack and mounted in bridging relation across the rods on said legs, each arm projecting inwardly toward another arm on the opposite side of said heater, a pair of housings mounted in bridging relation between the arms located on one side of said heater, an electrical resistance heater element mounted in each of said housings, a block suspended from said rack and located on the same side thereof as said legs, and electrical connecting means carried by said block and connected to said heating elements.

4. A bottled beverage heater comprising a rectangular rack for supporting beverage containers thereon, said rack comprising a plurality of spaced rods and connecting cross rods secured thereto forming a rectangle, leg members secured to some of the spaced rods at the corners of said rectangle, an arm secured to each of said leg members, a pair of elongated housings each mounted between a pair of said arms and extending substantially throughout the width of said rack, deflectors disposed at an angle away from said rack and carried on each of said housings and extending substantially throughout the length thereof, and heating means mounted in said housings.

5. A bottled beverage heater comprising a rectangular rack for supporting beverage containers thereon, said rack comprising a plurality of spaced rods and connecting cross rods secured thereto forming a rectangle, leg members secured to some of the spaced rods at the corners of said rectangle, an arm secured to each of said leg members, a pair of heating elements each mounted between a pair of said arms and extending substantially throughout the width of said rack, and a deflector disposed at an angle away from said rack and carried on each of said heating elements.

6. A bottled beverage heater comprising a rack for supporting beverage containers thereon, said rack comprising a plurality of spaced rods and connecting cross rods secured thereto, leg members secured to some of the spaced rods, an arm secured to said leg members, a heating element mounted between a pair of said arms and extending substantially throughout the width of said rack, and a deflector disposed at an angle away from said rack and carried over said heating element.

7. A heater for supporting beverage containers to be heated thereon, said heater comprising a rack having a plurality of spaced rods and connecting cross rods secured thereto forming substantially a rectangle, U-shaped rods secured at the ends thereof to said rack and forming legs, an arm secured to each of said U-shaped rods across the spaced sides of the leg and having an end projecting inwardly therefrom, and means secured to the projecting ends of said arms spaced laterally from the U-shaped rods below said rack for supporting heating means for the containers.

JAMES W. TAYLOR.

References Cited in the file of this patent

UNITED STATES PATENTS

| Number | Name | Date |
|---|---|---|
| 1,034,130 | Madsen | July 30, 1912 |
| 1,154,411 | Kuhn et al. | Sept. 21, 1915 |
| 1,359,275 | Robertson | Nov. 16, 1920 |
| 1,542,330 | Ball | June 16, 1925 |
| 1,645,327 | Hirshfeld | Oct. 11, 1927 |
| 1,661,354 | Ayre | Mar. 6, 1928 |
| 1,835,602 | Kercher et al. | Dec. 8, 1931 |
| 1,873,053 | Shaw | Aug. 23, 1932 |
| 1,929,178 | Phelps et al. | Oct. 3, 1933 |
| 2,078,650 | Clark | Apr. 27, 1937 |
| 2,091,746 | Wiley | Aug. 31, 1937 |
| 2,369,803 | Sardeson | Feb. 20, 1945 |

FOREIGN PATENTS

| Number | Country | Date |
|---|---|---|
| 606,868 | Germany | Dec. 12, 1934 |